United States Patent [19]

Otsuki et al.

[11] Patent Number: 5,192,944
[45] Date of Patent: Mar. 9, 1993

[54] SOLAR-POWERED DISPLAY DEVICE

[75] Inventors: Masatoshi Otsuki; Yasuyoshi Kawanishi; Kenji Sawada; Yoshinori Kaido; Takayuki Mizumura; Masayoshi Maeba, all of Hyogo, Japan

[73] Assignee: Sanyo Electric Co., Ltd., Moriguchi, Japan

[21] Appl. No.: 626,276

[22] Filed: Dec. 12, 1990

[30] Foreign Application Priority Data

Dec. 14, 1989 [JP] Japan .................... 1-144821[U]

[51] Int. Cl.$^5$ ............................ G09G 3/18; G09F 9/35
[52] U.S. Cl. ..................................... 340/765; 40/452; 323/906
[58] Field of Search ............... 340/716, 765, 755, 752, 340/754; 368/83, 204, 205, 84; 350/338; 40/452, 546, 544; 136/291; 323/906; 364/707, 708

[56] References Cited

U.S. PATENT DOCUMENTS

| | | |
|---|---|---|
| 3,757,511 | 9/1973 | Burgess et al. ............ 368/83 |
| 4,095,217 | 6/1978 | Tani et al. ............ 340/765 |
| 4,261,049 | 4/1981 | Komiyama et al. ............ 368/205 |
| 4,263,736 | 4/1981 | Beierwaltes et al. ............ 40/452 |
| 4,768,300 | 9/1988 | Rutili ............ 40/546 |
| 4,903,172 | 2/1990 | Schöniger et al. ............ 40/546 |
| 4,915,478 | 4/1990 | Lenko et al. ............ 350/338 |
| 4,959,642 | 9/1990 | Sharples ............ 340/716 |
| 4,994,941 | 2/1991 | Wen ............ 40/546 |

FOREIGN PATENT DOCUMENTS 1149685 6/1989 Japan .

Primary Examiner—Alvin E. Oberley
Assistant Examiner—Steven J. Saras
Attorney, Agent, or Firm—Morrison Law Firm

[57] ABSTRACT

A display device has a front panel including a solar battery on its surface. At least one window is formed in the solar battery to permit viewing a character formed in the front panel. Energy produced by the solar battery is stored in a storage battery for illuminating light emitting devices situated behind the front panel. The illumination provides background lighting for characters in the window of the front panel. Another embodiment of the invention uses a solar battery with an illuminated layer behind the front panel on which characters are displayed by either removing unwanted segments of a pre-formed character on the front panel or by adding segments of the characters with masking material.

14 Claims, 4 Drawing Sheets

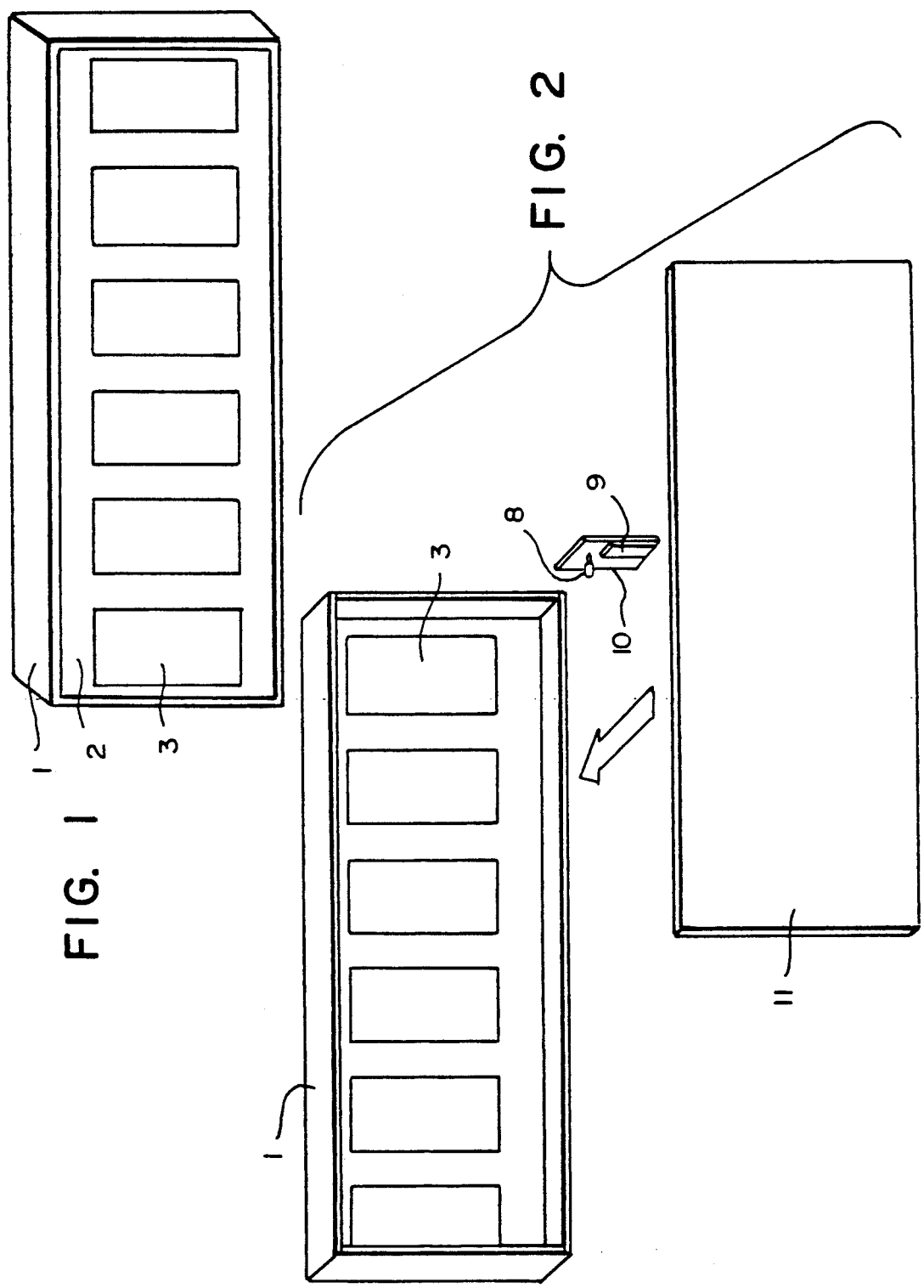

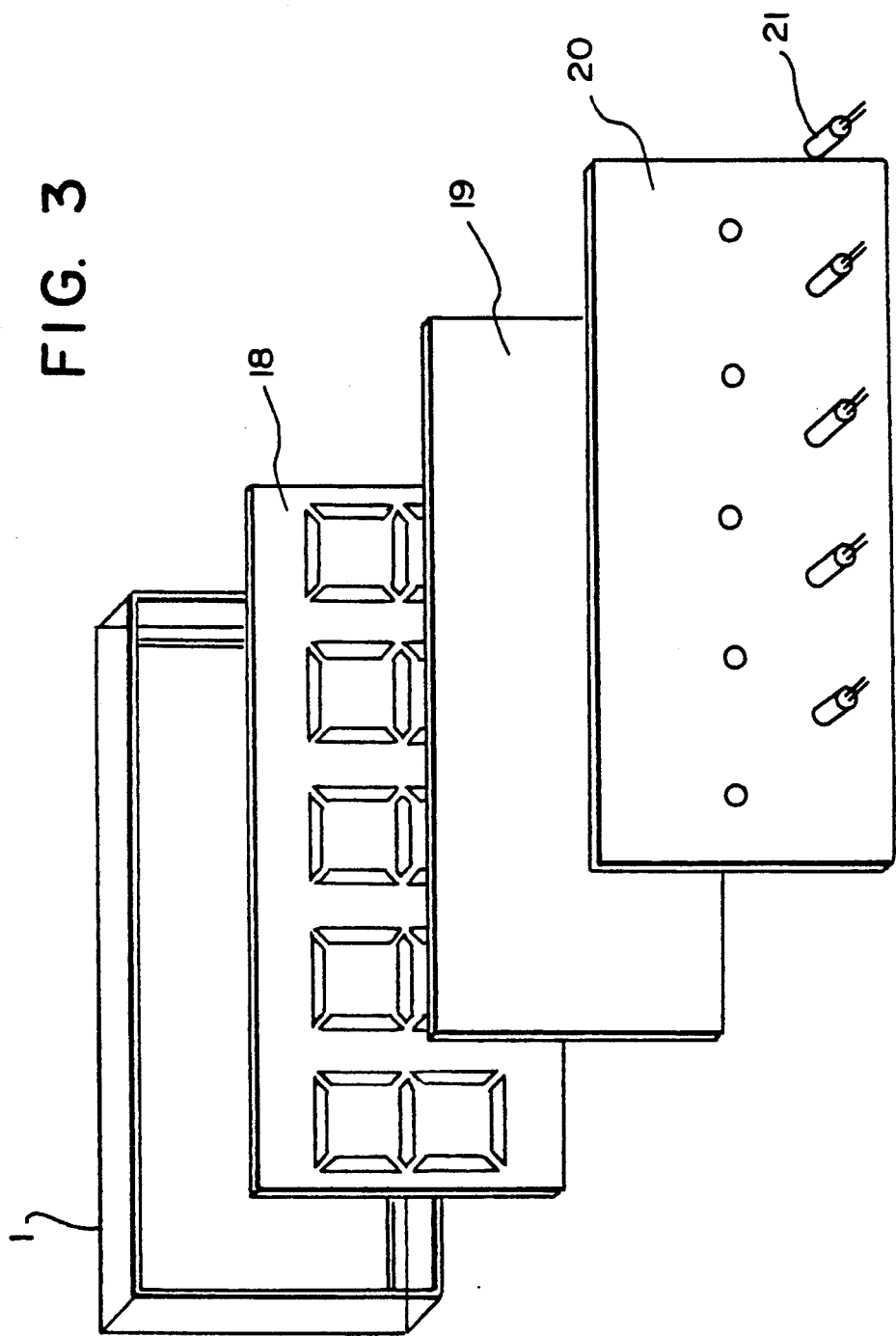

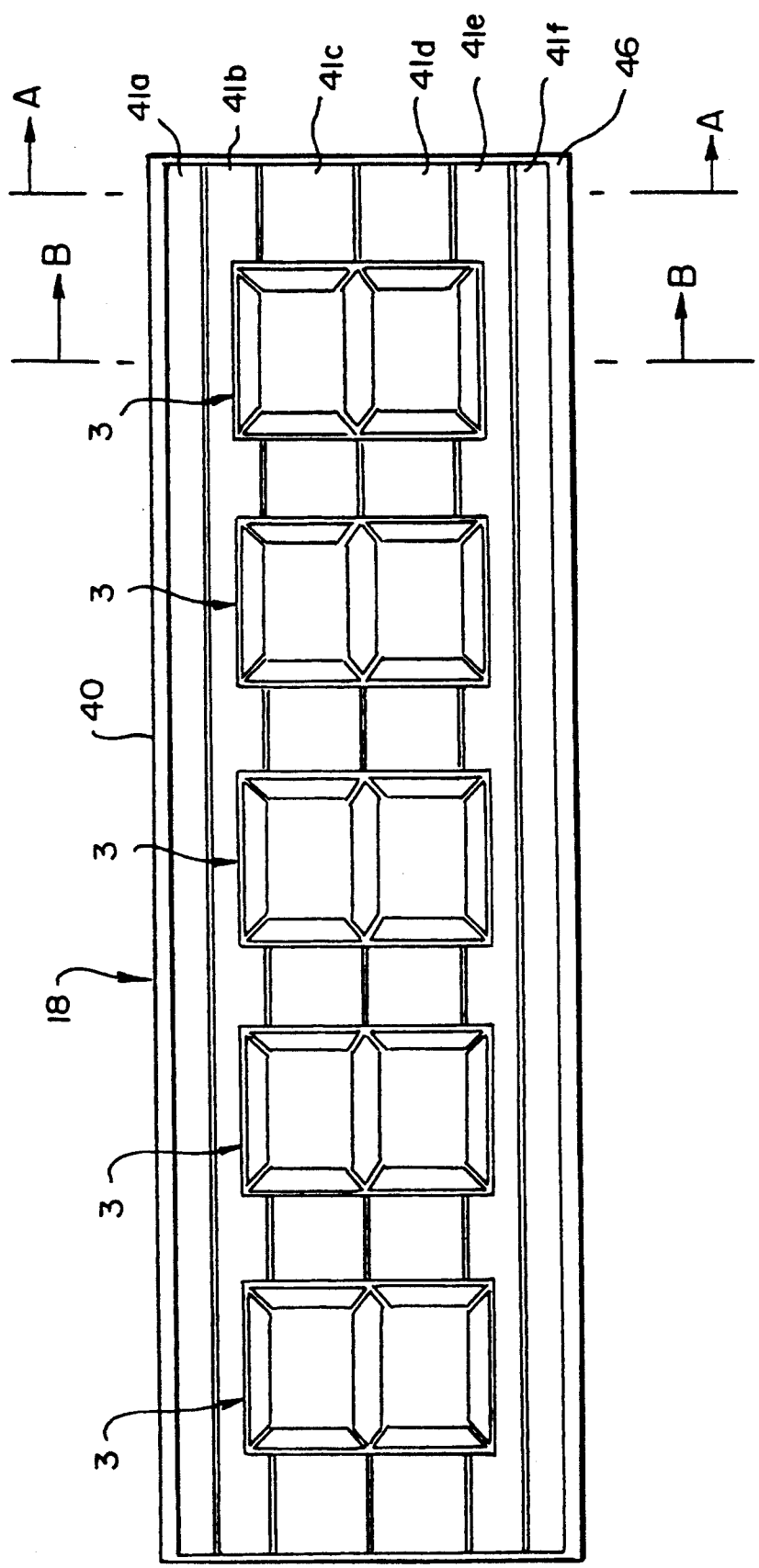

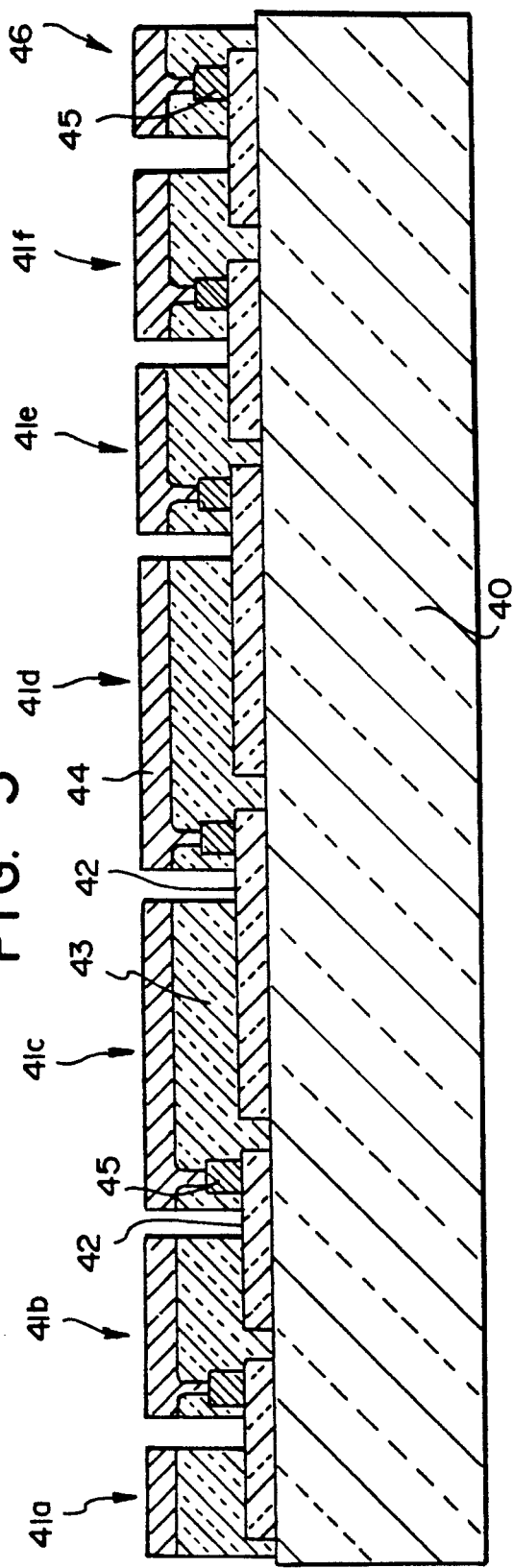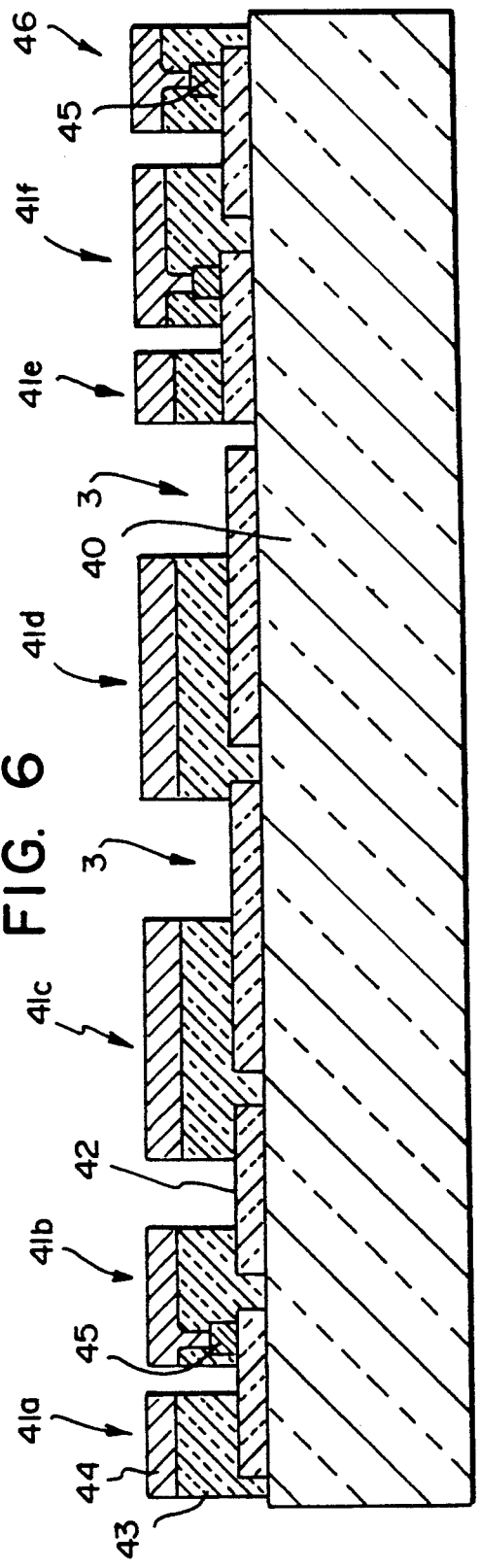

SOLAR-POWERED DISPLAY DEVICE

BACKGROUND OF THE INVENTION

The present invention relates to a solar-powered display device and, more particularly to a display device having means for illuminating a fixed array of characters on its front panel.

Japanese Laid-Open Utility Model Publication No. 1-149685 describes a display device with illuminating means located inside a housing and surrounded by a solar battery. Characters to be displayed are inscribed on the front panel of the device by the display device manufacturer. Since the user cannot freely create or change the permanently recorded display message, the usefulness of this device is limited.

OBJECT AND SUMMARY OF THE INVENTION

It is an object of the present invention to provide a portable, solar-powered display device capable of illuminating an array of user selected characters on a window of the device.

It is a further object of the present invention to provide a solar-powered display device that permits a user to freely create a display pattern, thereby enabling wide use.

The solar-powered display device of the current invention has a main body, a solar battery functioning as a front panel of the main body, a storage device situated inside the main body to store power generated by the solar battery, and at least one light emitting component. The light emitting component such as, for example, an LED, is situated behind the solar battery and is powered by the storage device. The illumination provided by the LED backlights a user selected character or array of characters impressed on a light transmissible panel.

Briefly stated, a display device has a front panel including a solar battery on its surface. At least one window is formed in the solar battery to permit viewing a character formed in the front panel. Energy produced by the solar battery is stored in a storage battery for illuminating light emitting devices situated behind the front panel. The illumination provides background lighting for characters in the window of the front panel. Another embodiment of the invention uses a solar battery with an illuminated layer behind the front panel on which characters are displayed by either removing unwanted segments of a pre-formed character on the front panel or by adding segments of the characters with masking material.

According to an embodiment of the invention, there is provided a light powered display device, comprising: a front panel, a solar battery on the front panel, at least one window in the solar battery, an electrical storage device for storing electrical energy generated by the solar battery, at least one light emitter powered by the electrical storage device, means for permitting the light emitter to provide background illumination for at least one character in the at least one window, and means for permitting changing of the at least one character.

According to a feature of the invention, there is provided a light powered display device, comprising: a front panel of the display device, a solar battery on the front panel, an electrical storage device for storing electrical energy from the solar battery, a light diffusion plate behind the front panel, a light emitter capable of illuminating the light diffusion plate, means for forming characters in the front panel, the means for forming characters including a plurality of individually removable segments, means for permitting light from the light diffusion plate to be seen through removed ones of the removable segments, whereby a lighted pattern is created.

According to a further feature of the invention, there is provided a display device comprising: a front panel, the front panel being transparent, a solar battery on a surface of the front panel, at least one window in the solar battery, means for forming a character in the at least one window, means for illuminating a rear of the at least one window, whereby the character is made visible.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a front perspective view of an embodiment of this invention.

FIG. 2 is a rear perspective view of the same embodiment of the invention with the rear panel removed.

FIG. 3 is an exploded perspective view of a rear side of a further embodiment according to this invention.

FIG. 4 is a front view of a solar-powered battery having five segment digit windows to be used in a further embodiment according to this invention.

FIG. 5 is a section of FIG. 4 taken along line A—A.

FIG. 6 is a section of FIG. 4 taken along line B—B.

DETAILED DESCRIPTION OF THE PREFERRED EMBODIMENTS

Referring to FIG. 1, a main body 1 has a front panel including a solar battery 2 on a rear surface thereof. Solar battery 2 includes a plurality of rectangular transparent windows 3 arranged in a predetermined pattern (six windows in a row in this embodiment). Solar battery 2 forms the frames of windows 3. Since such frames are normally included in a display, for aesthetic purposes, solar battery 2 occupies space that normally lacks function.

Solar battery 2 can be manufactured by any suitable method. The method selected depends, to a large extent, upon the type of material forming solar battery 2. When solar battery 2 is made from a single crystal silicon or polycrystal silicon, it formed with windows 3 before being affixed on a clear substrate (glass, plastic, etc.). When solar battery 2 is made from amorphous silicon, a continuous layer of amorphous silicon is laid down on the clear substrate. Then, windows 3 are formed by a wet or dry etching treatment.

Referring to FIG. 2, a light emitter 8 such as, for example, a light-emitting diode (LED), is positioned behind solar battery 2. A storage device 9, such as a Ni-Cd battery, stores electrical energy produced by solar battery 2. A control circuit 10 provides mounting for light emitter 8 and storage device 9. Control circuit 10 also provides electrical connection between solar battery 2, light emitter 8 and storage device 9. Control circuit 10 can be situated within main body 1. A rear panel 11 closes the rear of main body 1. Rear panel 11 is a metal, plastic or glass plate with a reflective surface facing the interior of main body 1 to enhance the quantity of light striking window 3 from light emitter 8.

When rear panel 11 is a glass or plastic plate, the reflective surface is conveniently a metal foil applied to the inner surface thereof.

Characters on window 3 of solar battery 2 are either impressed on the face of window 3 or are user-affixed paste-on characters. In either case, the characters are advantageously seen against an illuminated white background.

Sunlight, or other high intensity light, striking solar battery 2, causes electrical energy to be generated for storage by storage device 9. Stored electrical energy powers light emitter 8 and thus provides background illumination for defining the characters impressed on window 3 of solar battery 2.

Alternatively, window 3 also can have a single large display area instead of separate areas for each character, thus enabling the display of any desired graphic, or alphanumeric characters.

Referring to FIG. 3, another embodiment of the invention is shown wherein a light diffuser 19 is disposed behind a solar battery 18. A plurality of light emitters 21, for example LED's, are mounted on a control circuit 20. Light from light emitters 21 is evenly dispersed by light diffuser 19 to provide uniform, diffuse background lighting for the display characters on solar battery 18.

Referring to FIGS. 4, 5 and 6, solar battery 18 includes five segmented character windows 3. Six generating elements 41a–41f are disposed on a clear substrate 40 made of, for example, glass or heat-resistant plastic. Each of generating elements 41a–41f consists of three layers. Starting from a transparent substrate 40 they are: a transparent electrode film 42, a semiconductor film 43, and an electrode backing film 44. Transparent electrode film 42 is made from transparent conductive oxides such as indium oxide ($In_2O_3$), tin oxide ($SnO_2$) and indium tin oxide (ITO). Semiconductor film 43 is made from an amorphous semiconductor such as, for example, amorphous silicon and amorphous silicon carbide. Electrode backing film 44 is a layer or laminated layers of low resistance metals such as aluminum, titanium and silver.

Referring to FIG. 5, generating elements 41a–41f are electrically connected in series so that clear electrode film 42 of an element to its left and electrode backing film 44 of an element on its right are electrically connected by a belt-shaped conductive member 45, which is made of metal paste such as silver (Ag) paste. A seventh electrode 46, is connected to clear electrode film 42 of generating element 41f to serve as an output connector of solar battery 18. Power produced by generating elements 41a–41f is supplied through electrode backing film 44 of generating element 41a and output electrode 46 to storage device 9.

The character appearing in window 3 is created by removing the segments of the numeral-eight segmented characters in window 3. The segments are removed by stripping the lamination of semiconductor film 43 and electrode backing film 44 using either a wet or dry process.

As shown in FIG. 4 and cross section B—B of FIG. 6, generating elements 41c and 41d are separated into six small generating elements created by areas at the left and right of solar battery 2 and the areas between the segmented character areas. Areas within each segmented character are electrically isolated and do not contribute to power generation. As illustrated in FIG. 4, masking of selected segments of the five characters (shown as whitened segments in FIG. 4), form the numerals 1, 2, 3, 4, and 5 for display.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A light powered display device, comprising:
   a front panel;
   a solar battery on said front panel;
   at least one window in said solar battery;
   an electrical storage device for storing electrical energy generated by said solar battery;
   at least one light emitter powered by said electrical storage device;
   means for permitting said light emitter to provide background illumination for at least one character fixed on a surface of said front panel in said at least one window; and
   means for permitting changing of said at least one character.

2. A light powered display device according to claim 1, wherein:
   said means for permitting changing includes means for permitting at least one of addition and removal of at least one segment of a character pattern.

3. A light powered display device, comprising:
   a front panel of said display device;
   a solar battery on said front panel;
   an electrical storage device for storing electrical energy from said solar battery;
   a light diffusion plate behind said front panel;
   a light emitter capable of illuminating said light diffusion plate;
   means for forming characters fixed on a surface of said front panel;
   said means for forming characters including a plurality of individually removable segments;
   means for permitting stripping of parts of said solar battery to form said removable segments; and
   means for permitting light from said light diffusion plate to be seen through removed ones of said removable segments, whereby a lighted pattern is created.

4. A display device comprising:
   a front panel;
   said front panel being transparent;
   a solar battery on a rear surface of said front panel;
   at least one window in said solar battery;
   an electrical storage device for storing electrical energy from said solar battery;
   means for forming a character fixed on a surface of said front panel framed by said at least one window;
   means for illuminating a rear of said at least one window, whereby said character is made visible; and
   said means for illuminating being powered by said electrical storage device.

5. A display device according to claim 4, wherein said means for illuminating includes:
   means for storing electrical energy produced by said solar battery; and
   at least one light source, energizeable by said means for storing.

6. A display device according to claim 5, further comprising:
   a light diffuser behind said front panel; and said at least one light source illuminating said light diffuser, whereby a uniform diffuse light is provided behind said character.

7. A display device according to claim 4, wherein:
said at least one window includes a plurality of windows; and
said means for illuminating includes at least one light emitter behind each of said plurality of windows.

8. A display device according to claim 5, further comprising a reflective panel behind said at least one light source.

9. A display device according to claim 8, wherein said reflective panel includes a metallic foil.

10. A display device according to claim 4, wherein:
means for forming includes at least one segment which can be selectively removed or installed.

11. A solar-powered battery for use in a solarpowered battery driven electric light display, comprising:
a transparent substrate forming a front sheet of said display;
said solar powered battery being disposed on a surface of said transparent substrate;
means for permitting stripping of parts of said solar battery to form at least one window in said solar-powered battery;
characters fixed on a surface of said transparent substrate in said at least one window being displayed in said window.

12. A solar-powered battery as claimed in claim 11, in which said characters are replaceable.

13. A solar-powered battery for use of a solar-powered battery driven electric light display according to claim 11, wherein said characters are transparent segments.

14. A solar-powered battery for use of a solar-powered battery driven electric light display according to claim 11, wherein said characters are opaque segments.

* * * * *